United States Patent
Künstle et al.

(10) Patent No.: US 6,746,555 B1
(45) Date of Patent: Jun. 8, 2004

(54) LOW-EMISSION ADHESIVES BASED ON AN AQUEOUS, PROTECTIVE-COLLOID-FREE DISPERSION OF VINYL ACETATE-ETHYLENE COPOLYMERS

(75) Inventors: Holger Künstle, Burghausen (DE); Rudolf Weissgerber, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/612,166

(22) Filed: Jul. 8, 2000

(30) Foreign Application Priority Data

Jul. 8, 1999 (DE) .......................... 199 31 827

(51) Int. Cl.⁷ .............................. B32B 31/00
(52) U.S. Cl. .................. 156/71; 524/833; 524/823
(58) Field of Search ................. 524/833, 823; 156/71

(56) References Cited

U.S. PATENT DOCUMENTS

| | | | |
|---|---|---|---|
| 4,322,516 A | * 3/1982 | Wiest et al. | 526/307.7 |
| 4,540,739 A | * 9/1985 | Midgley | 524/823 |
| 4,714,728 A | * 12/1987 | Graham et al. | 524/833 |
| 4,831,077 A | 5/1989 | Ball et al. | |
| 4,997,879 A | * 3/1991 | Weissgerber et al. | 524/823 |
| 5,371,137 A | 12/1994 | Blinow et al. | |
| 5,569,703 A | * 10/1996 | Yoshii et al. | 524/823 |
| 5,665,816 A | 9/1997 | Gerharz et al. | |
| 6,084,024 A | * 7/2000 | Mao et al. | 524/832 |

FOREIGN PATENT DOCUMENTS

| | | |
|---|---|---|
| EP | 0 017 986 | 10/1980 |
| EP | 0 185 356 | 6/1986 |
| EP | 0 216 210 | 4/1987 |
| EP | 0295727 | 12/1988 |
| EP | 0 699 692 | 3/1996 |
| EP | 0841351 | 5/1998 |
| EP | 0 841 351 | 5/1998 |
| JP | 47-3705 B | * 2/1972 |
| JP | 4-145182 A | * 5/1992 |

OTHER PUBLICATIONS

Fox T.G., Bull. Am. Physics Soc. 1, 3, p. 123 [1956].
Polymer Handbook, 2$^{nd}$ Edition, j. Wiley & Sons, New York [1975].

* cited by examiner

Primary Examiner—Jeff H. Aftergut
(74) Attorney, Agent, or Firm—Brooks Kushman P.C.

(57) ABSTRACT

The invention provides low-emission adhesives based on an aqueous, protective-colloid-free polymer dispersion or water-redispersible dispersion powders, obtainable therefrom, of vinyl acetate-ethylene copolymers, obtainable by free-radically initiated emulsion polymerization, in aqueous medium and in the presence of one or more emulsifiers, of a comonomer mixture comprising a) from 5 to 50% by weight of ethylene, b) from 20 to 80% by weight of at least one vinyl ester from the group of vinyl esters of unbranched or branched carboxylic acids having 1 to 9 carbon atoms whose homopolymers have a glass transition temperature $Tg > 0°$ C., c) from 5 to 70% by weight of at least one vinyl ester from the group of vinyl esters of branched carboxylic acids having 8 to 13 carbon atoms whose homopolymers have a glass transition temperature $Tg < 0°$ C., d) from 0.5 to 10% by weight of at least one ethylenically unsaturated monocarboxylic or dicarboxylic acid having 3 or 4 carbon atoms, e) from 0 to 10% by weight of at least one ethylenically unsaturated, hydroxyalkyl-functional comonomer, f) from 0 to 10% by weight of further, mono- or polyethylenically unsaturated comonomers, the % by weight being based in each case on the overall weight of the comonomers and adding up to 100% by weight, and the dispersion obtained therewith being dried if desired.

19 Claims, No Drawings

LOW-EMISSION ADHESIVES BASED ON AN AQUEOUS, PROTECTIVE-COLLOID-FREE DISPERSION OF VINYL ACETATE-ETHYLENE COPOLYMERS

BACKGROUND OF THE INVENTION

1) Field of the Invention

The invention relates to low-emission adhesives based on an aqueous, protective-colloid-free polymer dispersion or to water-redispersible dispersion powders, obtainable therefrom, and also to vinyl acetate-ethylene copolymers.

2) Background Art

It is known to use dispersions based on acrylate polymers as pressure-sensitive adhesives and flooring adhesives. These dispersions are suitable for applications as pressure-sensitive and flooring adhesives since owing to the low glass transition temperature of the acrylate polymers, usually based on butyl acrylate and/or 2-ethylhexyl acrylate, the required surface tack is achieved.

EP-A 17896 (U.S. Pat. No. 4,322,516) discloses vinyl acetate-ethylene copolymers which contain a high proportion of acrylate and which exhibit good surface tack even without the addition of tackifier resins. EP-A 185356 (U.S. Pat. No. 4,831,077) and EP-A 216210 (U.S. Pat. No. 4,997,879) relate to vinyl acetate-ethylene copolymers which have an acrylate fraction and which owing to the copolymerization of hydroxy-functional comonomers still exhibit excellent adhesion even at elevated temperatures.

On an alkaline substrate at a pH >9.0, however, as a result of hydrolysis of the ester group, acrylate-containing dispersions give off the corresponding alcohols. For instance, butyl acrylate gives off butanol and 2-ethylhexyl acrylate gives off 2-ethylhexanol, which may be emitted to the ambient air. Since this hydrolysis cannot be stopped, these alcohols will be emitted to the environment from the applied dispersion over a period of weeks, months and years.

The object of the invention is therefore to develop an adhesive dispersion with which this emissions problem does not arise but which in terms of surface tack, adhesion, and tackiness, is characterized by properties comparable with that of acrylate-containing dispersions.

This object has been achieved by replacing the acrylate fraction in the copolymer with branched vinyl ester units.

From EP-A 699692 (U.S. Pat. No. 5,665,816) it was known, for the purpose of improving the adhesion on untreated polyolefin substrates, to use adhesive dispersions containing cellulose ethers grafted onto vinyl acetate-ethylene copolymers which also have acrylate fractions and fractions of branched vinyl esters. In EP-A 841351, it is recommended that the acrylates be copolymerized with vinyl esters of neo acids in order to improve the adhesion of polyacrylate-based pressure-sensitive adhesives on nonpolar surfaces. U.S. Pat. No. 5,371,137 describes the use of vinyl acetate-ethylene copolymers modified with long-chain vinyl esters for improving the adhesion on nonpolar surfaces.

SUMMARY OF THE INVENTION

The invention provides low-emission adhesives based on an aqueous, protective-colloid-free polymer dispersion or water-redispersible dispersion powders, obtainable therefrom, of vinyl acetate-ethylene copolymers, obtainable by free-radically initiated emulsion polymerization, in an aqueous medium and in the presence of one or more emulsifiers, of a comonomer mixture comprising a) from 5 to 50% by weight of ethylene, b) from 20 to 80% by weight of one or more vinyl esters from the group of vinyl esters of unbranched or branched carboxylic acids having 1 to 9 carbon atoms whose homopolymers have a glass transition temperature Tg >0° C., c) from 5 to 70% by weight of one or more vinyl esters from the group of vinyl esters of branched carboxylic acids having 8 to 13 carbon atoms whose homopolymers have a glass transition temperature Tg <0° C., d) from 0.5 to 10% by weight of one or more ethylenically unsaturated monocarboxylic or dicarboxylic acids having 3 or 4 carbon atoms, e) from 0 to 10% by weight of one or more ethylenically unsaturated, hydroxyalkyl-functional comonomers, f) from 0 to 10% by weight of further, mono- or poly-ethylenically unsaturated comonomers, the % by weight being based in each case on the overall weight of the comonomers and adding up to 100% by weight, and the dispersion obtained therewith being dried if desired.

It is preferred to copolymerize from 10 to 40% by weight of ethylene.

DESCRIPTION OF THE PREFERRED EMBODIMENTS

Suitable vinyl esters b) from the group of vinyl esters of unbranched or branched carboxylic acids having 1 to 9 carbon atoms whose homopolymers have a glass transition temperature Tg >0° C. are vinyl acetate, vinyl propionate, vinyl butyrate, 1-methylvinyl acetate, vinyl pivalate, and vinyl esters of α-branched monocarboxylic acids having 9 carbon atoms (VeoVa9®, a trade name of the Shell company). Preference is given to vinyl acetate, vinyl propionate, and VeoVa9®. Particular preference is given to vinyl acetate. Most preferably, from 45 to 70% by weight of vinyl esters b) are copolymerized.

Suitable vinyl esters c) from the group of vinyl esters of branched carboxylic acids having 8 to 12 carbon atoms whose homopolymers have a glass transition temperature Tg >0° C. are vinyl 2-ethylhexanoate, vinyl esters of α-branched monocarboxylic acids having 10 or 11 carbon atoms (VeoVa10®, VeoVa11® trade names of Shell), and vinyl esters of branched monocarboxylic acids having 10 to 13 carbon atoms (Exxar Neo12). Preference is given to the vinyl esters of α-branched monocarboxylic acids having 10 or 11 carbon atoms (VeoVa10®, VeoVa11®). Most preferably, from 10 to 45% by weight of vinyl esters c) are copolymerized.

Suitable ethylenically unsaturated monocarboxylic and dicarboxylic acids d) are acrylic acid, methacrylic acid, itaconic acid, fumaric acid, and maleic acid, preference being given to acrylic acid, methacrylic acid, and itaconic acid. Acrylic acid and methacrylic acid are particularly preferred. Most preferably, from 2 to 6% by weight of comonomers d) are copolymerized.

Suitable ethylenically unsaturated, hydroxyalkyl-functional comonomers e) are methacrylic and acrylic hydroxyalkyl esters having a $C_1$ to $C_5$ alkyl radical such as hydroxyethyl, hydroxypropyl or hydroxybutyl acrylate or methacrylate; preferably, hydroxyethyl acrylate, hydroxyethyl methacrylate, hydroxypropyl acrylate. Most preferably, from 0 to 5% by weight of comonomers e) are copolymerized.

Examples of mono- or polyethylenically unsaturated comonomers f) are functional comonomers such as ethylenically unsaturated carboxamides and carbonitriles, preferably acrylamide and acrylonitrile; monoesters and diesters of fumaric acid and maleic acid such as the diethyl and diisopropyl esters and also maleic anhydride, ethylenically unsaturated sulfonic acids and their salts, preferably vinylsulfonic acid, 2-acrylamido-2-methylpropanesulfonic acid. Further examples are pre-crosslinking comonomers such as polyethylenically unsaturated comonomers, examples being divinyl adipate, diallyl maleate, allyl methacrylate and triallyl cyanurate or postcrosslinking comonomers, examples being N-methylolacrylamide (NMA), N-methylolmethacrylamide, alkyl esters such as the isobutyoxy ether or esters of N-methylolacrylamide. Also suitable are epoxy-functional comonomers such as glycidyl methacrylate and glycidyl acrylate. Further examples are siliconfunctional comonomers, such as acryloxypropyltri(alkoxy)- and methacryloxypropyltri(alkoxy)-silanes, vinyltrialkoxysilanes, and vinylmethyldialkoxysilanes.

The preferred auxiliary monomers f) are ethylenically unsaturated carboxamides such as acrylamide and methacrylamide, ethylenically unsaturated sulfonic acids and their salts such as vinylsulfonic acid and vinylpyrrolidone. Acrylamide is particularly preferred. Most preferably, from 0 to 2% by weight of comonomers f) are copolymerized.

In the copolymers, the amounts in percent by weight add up in each case to 100% by weight. In general, the monomers and/or the weight fractions of the comonomers, are selected so as to give a glass transition temperature Tg of less than 0° C., preferably, from −60° C. to −10° C.

The glass transition temperature Tg of the polymers can be determined in a known manner by means of differential scanning calorimetry (DSC). The Tg can also be calculated approximately in advance using the Fox equation. According to Fox T. G., Bull. Am. Physics Soc. 1, 3, page 123 (1956), the following is true: $1Tg=X_1Tg_1+x_2/Tg_2+ \ldots +x_n/Tg_n$, where $x_n$ is the mass fraction (% by weight/100) of the monomer n, and $Tg_n$ is the glass transition temperature, in kelvins, of the homopolymers of the monomer n. Tg values for homopolymers are listed in Polymer Handbook, 2nd edition, J. Wiley & Sons, New York (1975).

Particularly preferred copolymers consist of the following comonomer units:
from 10 to 40% by weight of ethylene, b) from 35 to 70% by weight of vinyl acetate, c) from 10 to 45% by weight of VeoVa10® and/or VeoVa11®, d) from 2 to 6% by weight of acrylic acid and/or methacrylic acid, e) from 0 to 5% by weight of hydroxyethyl acrylate, and f) from 0 to 2% by weight of acrylamide.

Preparation by the emulsion polymerization process takes place at from 30° C. to 90° C., preferably from 45° C. to 70° C., and under a pressure of from 30 to 100 bar abs., preferably from 40 to 80 bar abs. The polymerization can be conducted by the batch technique where all components are included in the initial charge to the reactor and by the metering technique where individual components, or a number of components are fed in during the polymerization. The feeds can be made separately (spatially and temporally), or the components to be metered in can be metered in in whole or in part in pre-emulsified form. Preference is given to the batch technique wherein the comonomer components a), b) and c) are included in the initial charge and initiators, emulsifiers and any other comonomers d), e) and f) are metered in.

The polymerization is initiated using the initiators or redox initiator combinations generally for emulsion polymerization; examples are hydroperoxides such as tert-butyl hydroperoxide, tert-butyl peroxopivalate, cumene hydroperoxide, isopropylbenzene monohydroperoxide, azo compounds such as azobisisobutyronitrile, inorganic initiators such as the sodium, potassium and ammonium salts of peroxodisulfuric acid. The initiators are generally used in an amount of from 0.05 to 3% by weight based on the overall weight of the monomers. The redox initiators used are combinations of said initiators with reducing agents. Suitable reducing agents are the sulfites and bisulfites of the alkali metals and of ammonium, an example being sodium sulfite, the derivatives of sulfoxylic acid such as zinc or alkali metal formaldehyde sulfoxylates such as sodium hydroxymethanesulfinate (Rongalit®), and ascorbic acid or isoascorbic acid. The amount of reducing agent is preferably from 0.01 to 5.0% by weight based on the overall weight of the monomers.

Preference is given to redox catalyst combinations comprising sodium, potassium or ammonium salts of peroxodisulfuric acid as the oxidizing component and ascorbic acid or iso-ascorbic acid as the reducing agent.

The polymerization batch is stabilized using emulsifiers with the exclusion of protective colloids. The overall amount of emulsifier is preferably from 0.1 to 5% by weight, in particular, from 0.5 to 3% by weight, based on the overall weight of the comonomers. Suitable emulsifiers are anionic or non-ionic emulsifiers or mixtures thereof, examples being the following:

1) Alkyl sulfates, especially those having a chain length of 8 to 18 carbon atoms; alkyl and alkylaryl ether sulfates having 8 to 18 carbon atoms in the hydrophobic radical and from 1 to 50 ethylene oxide units.
2) Sulfonates, especially alkyl sulfonates having 8 to 18 carbon atoms; alkylaryl sulfonates having 8 to 18 carbon atoms, esters and monoesters of sulfosuccinic acid with monohydric alcohols or alkylphenols having 4 to 15 carbon atoms in the alkyl radical; if desired, these alcohols or alkylphenols may also have been ethoxylated with from 1 to 40 ethylene oxide units.
3) Phosphoric acid partial esters and their alkali metal salts and ammonium salts, especially alkyl and alkylaryl phosphates having 8 to 20 carbon atoms in the organic radical, alkyl and alkylaryl ether phosphates having 8 to 20 carbon atoms in the alkyl or alkylaryl radical, respectively, and from 1 to 50 EO units.
4) Alkyl polyglycol ethers preferably having from 8 to 40 EO units and with alkyl radicals having 8 to 20 carbon atoms.
5) Alkylaryl polyglycol ethers preferably having from 8 to 40 EO units and having 8 to 20 carbon atoms in the alkyl and aryl radicals.
6) Ethylene oxide/propylene oxide (EO/PO) block copolymers preferably having from 8 to 40 EO and/or PO units.

Preference is given to alkyl and alkylaryl ether sulfates having 8 to 18 carbon atoms in the hydrophobic radical and from 1 to 50 ethylene oxide units such as sulfated nonylphenol ethoxylates and sulfated isotridecyl ethoxylates.

For adjusting the molecular weight, it is possible during the polymerization to add the regulators commonly used, examples being n-dodecyl mercaptan, t-dodecyl mercaptan, mercaptopropionic acid, methyl mercaptopropionate, isopropanol, and acetaldehyde, preferably in amounts of from 0.1 to 3.0% by weight based on the overall weight of the monomers.

The aqueous dispersions obtainable by the process of the invention have a solids content of from 30 to 75% by weight, preferably from 40 to 65% by weight. To prepare the water-redispersible dispersion powders, the aqueous dispersions are dried in a known manner, by means for example of fluidized-bed drying, freeze drying, and, preferably, spray drying.

Adhesives are suitable in particular for applications as pressure-sensitive adhesives and as flooring, wall and ceiling adhesives. The preferred field of application is that as a flooring adhesive for bonding elastic and textile coverings. Particular preference is given to their application as low-emission flooring adhesives. Appropriate formulations for flooring adhesives generally include from 15 to 50% by weight of dispersion, from 5 to 35% by weight of tackifier resin, from 15 to 50% by weight of filler, the proportions in % by weight adding up in each case to 100% by weight. For wall and ceiling adhesives, this formulation may also be used in combination with natural thickeners such as cellulose and starch or with synthetic thickeners. In these two fields of application, the aforesaid formulation is often also used without the addition of tackifier resins. Typical formulations for pressure-sensitive adhesives are in many cases based only on the adhesive dispersion. If desired, tackifier resins or processing aids may be added.

What is advantageous about the claimed systems is that no alcohols such as butanol or 2-ethylhexanol can be released from the dispersion on alkaline substrates by hydrolysis and at the same time, the performance properties, in particular high surface tack, high adhesion (peel strength) and high cohesion (resistance to shear) of the acrylate-containing dispersions are attained. In contrast, Vac/E systems of comparable Tg exhibit low cohesion, adhesion and tack and poor spreadability in flooring adhesive formulations.

The examples which follow serve to illustrate the invention:

EXAMPLE 1

395 g of demineralized water, 5 g of a $C_{15}$ alkylsulfonate, 15 g of an ethoxylated isotridecyl alcohol containing 25 EO units, 8 g of acrylic acid, 117 g of VeoVa11®, and 643 g of vinyl acetate were weighed out into a 2 l stirred autoclave. The pH was adjusted to 3.5 using sodium hydroxide solution. The batch was heated to 50° C. and ethylene was injected up to 50 bar.

The polymerization was initiated and maintained by simultaneous metering of 10 ml/h sodium persulfate (10% strength aqueous solution) and 10 ml/h ascorbic acid (5% strength aqueous solution) in each case. Following initiation, 25 g of acrylic acid and 67 g of an ethoxylated isotridecyl alcohol containing 25 EO units were metered in continuously over a period of 4 hours. The pH during the polymerization was kept constant at between 3.7 and 4.7. 30 minutes after the beginning of reaction, further ethylene was injected to 70 bar and the ethylene pressure was maintained until the end of metering of the emulsifier solution. Following the end of emulsifier metering, the initiator feeds were retained until the end of the reaction.

Cooling and letdown gave a stable dispersion having a solids content of 62.5% and a Brookfield viscosity of 6400 mPas at 20 rpm and a pH of 4.6. The ethylene content of the dispersion was 22% by weight.

EXAMPLE 2

The procedure of Example 1 was repeated. However, 205 g of VeoVa11® and 555 g of vinyl acetate were used. Cooling and letdown gave a stable dispersion having a solids content of 61.2% and a Brookfield viscosity of 4600 mPas at 20 rpm and a pH of 4.6.

EXAMPLE 3

The procedure of Example 1 was repeated. However, 263 g of VeoVa11® and 497 g of vinyl acetate were used. Cooling and letdown gave a stable dispersion having a solids content of 60.9% and a Brookfield viscosity of 5200 mPas at 20 rpm and a pH of 4.4.

EXAMPLE 4

The procedure of Example 2 was repeated, but 15 ml/h sodium persulfate (10% strength aqueous solution) and 15 ml/h ascorbic acid (5% strength aqueous solution) were metered in each case. In addition, 0.4 g of dodecyl mercaptan was added to the emulsifier feed containing acrylic acid.

Cooling and letdown gave a stable dispersion having a solids content of 59.7% and a Brookfield viscosity of 2600 mPas at 20 rpm and a pH of 4.5.

EXAMPLE 5

The procedure of Example 2 was repeated. However, only 30.75 g of VeoVa11® and 82.25 g of vinyl acetate included in the initial charge and ethylene was injected to 52 bar. The remaining amounts of 174.25 g of VeoVa11® and 471.75 g of vinyl acetate were metered in continuously over a period of 5 hours. Cooling and letdown gave a stable dispersion having a solids content of 59.5% and a Brookfield viscosity of 8400 mPas at 20 rpm and a pH of 4.7.

EXAMPLE 6

The procedure of Example 5 was repeated, but an additional 15 g of acrylamide were included in the initial charge.

Cooling and letdown gave a stable dispersion having a solids content of 58.8% and a Brookfield viscosity of 9700 mPas at 20 rpm and a pH of 4.6.

EXAMPLE 7

The procedure of Example 5 was repeated, but an additional 15 g of hydroxyethyl acrylate were metered in.

Cooling and letdown gave a stable dispersion having a solids content of 60.5% and a Brookfield viscosity of 6400 mPas at 20 rpm and a pH of 4.6.

EXAMPLE 8

The procedure of Example 1 was repeated, but the 117 g of VeoVa11® were replaced by the same amount of VeoVa10®.

Cooling and letdown gave a stable dispersion having a solids content of 61.6% and a Brookfield viscosity of 4900 mPas at 20 rpm and a pH of 4.6.

EXAMPLE 9

The procedure of Example 2 was repeated, but 205 g of VeoVa11® were replaced by the same amount of VelVa10®.

Cooling and letdown gave a stable dispersion having a solids content of 60.7% and a Brookfield viscosity of 4000 mPas at 20 rpm and a pH of 4.7.

EXAMPLE 10

The procedure of Example 3 was repeated, but 263 g of VeoVa11® were replaced by the same amount of VeoVa10®.

Cooling and letdown gave a stable dispersion having a solids content of 61.0% and a Brookfield viscosity of 6100 mPas at 20 rpm and a pH of 4.6.

COMPARATIVE EXAMPLE 11

The procedure of Example 3 was repeated, but copolymerizing as vinyl ester monomer produced only 760 g vinyl acetate and no VeoVa monomer.

Cooling and letdown gave a stable dispersion having a solids content of 62.3% and a Brookfield viscosity of 3800 mPas at 20 rpm and a pH of 4.5.

COMPARATIVE EXAMPLE 12

The procedure of comp. Ex. 11 was repeated, but with 150 g of vinyl acetate in the initial charge. The polymerization was initiated at 60° C. and with 58 bar of ethylene injected. Initiators used were 4.5 ml/h t-butyl hydroperoxide (10% strength) and 10 ml/h ascorbic acid (5% strength). 610 g of vinyl acetate were then metered in over a period of 6 h. Further ethylene was injected to 75 bar and maintained until 2 hours after the end of the vinyl acetate feed. Cooling and letdown gave a stable dispersion having a solids content of 61.4% and a Brookfield viscosity of 8400 mPas at 20 rpm and a pH of 4.7.

COMPARATIVE EXAMPLE 13

The procedure of Example 1 was repeated, but copolymerizing 673 g of vinyl acetate with 99 g of 2-ethylenehexyl acrylate instead of the VeoVa comonomer. Cooling and letdown gave a stable dispersion having a solids content of 61.2% and a Brookfield viscosity of 3400 mPas at 20 rpm and a pH of 4.7.

COMPARATIVE EXAMPLE 14

The procedure of Example 1 was repeated, but copolymerizing 569 g of vinyl acetate with 195 g of 2-ethylhexyl acrylate instead of the VeoVa comonomer. Cooling the letdown gave a stable dispersion having a solids content of 60.3% and a Brookfield viscosity of 3500 mPas at 20 rpm and a pH of 4.6.

COMPARATIVE EXAMPLE 15

The procedure of Example 1 was repeated, but copolymerizing 335 g of vinyl acetate with 460 g of 2-ethylhexyl acrylate instead of the VeoVa comonomer. Cooling and letdown gave a stable dispersion having a solids content of 61.2% and a Brookfield viscosity of 3400 mPas at 20 rpm and a pH of 4.7.

The adhesive properties were determined using the following methods:

For all measurements, the test adhesive dispersions were drawn down onto the support films using a bar in a thickness so as to give, after drying, a uniform polymer layer of from 24 to 26 g/m$^3$.

The results of the measurements are collated in Table 1.

Surface Tack

A 20 cm long and 2.5 cm wide adhesive strip (backing material: polymer-plasticized PVC, 0.1 mm thick) in the form of a loop hanging vertically with the adhesive layer outward was clamped into the upper jaws of a tensile testing machine. Subsequently, the "loop" was placed on a horizontally mounted, carefully cleaned glass plate, without applying pressure, in a length of about 3 cm, by running the two jaws of the tensile testing machine together vertically at a rate of 100 mm/minute. Immediately thereafter, at the same speed, the adhesive strip was peeled from the surface. The highest force required for the peeling of the loop is taken as a measure of the surface tack. The reported value in N/2.5 cm is the mean of five individual measurements, using a fresh adhesive strip and a fresh glass surface each time.

Adhesion (peel strength PS)

A 20 cm long and 2.5 cm wide adhesive strip was placed without bubbles, starting from one end, in a length of about 12 cm, on a carefully cleaned crystal glass surface. By 5-fold rolling (back and forth) with a steel roller coated with silicone rubber and weighing 2.2 kg, the adhesive strip was pressed on. Following storage in a controlled-climate chamber at 23° C. and 50% relative atmospheric humidity for 8 minutes or 24 hours, respectively, the adhesive strip was peeled over a length of 5 cm at an angle of 180° and at a rate of 300 mm/minute. The average force required to do this was measured. The reported values in N/2.5 cm are means of 5 individual measurements in each case.

Cohesion (resistance to shear RTS)

A 5 cm long and 2.5 cm wide adhesive strip was placed without bubbles on a carefully cleaned glass plate, with a bond area of 2.5 cm×2.5 cm, in such a way that the remaining section of adhesive strip projected beyond the edge of the glass plate. The strip was pressed on by rolling (5 times back and forth) with a steel roller coated with silicone rubber and weighing 2.2 kg. After a bonding time of 8 minutes, a glass plate was fastened in a mount at an angle of 2° to the vertical (in order to ensure the absence of peel forces) such that the free end of the adhesive strip hung downward. A weight of 2 kg was fastened, hanging freely, on this end. A measurement was made of the time taken for the free end of the adhesive strip to detach from the glass plate under the tension of the weight. The measurement was made in a controlled-climate chamber at 23° C. and 50% relative atmospheric humidity. The reported values in minutes are means of 3 individual measurements in each case.

The emission of the adhesives were determined in a formulation for flooring adhesives:

| Flooring adhesive formulation: | |
|---|---|
| Adhesive dispersion | 32.0% by weight |
| Rosin mixture | 20.0% by weight |
| Filler (Omyacarb 6, Omya GmbH) | 10.0% by weight |
| Filler (Omyacarb 20, Omya GmbH) | 26.0% by weight |
| Emulsifier (Witcolate B 320) | 0.5% by weight |
| Thickener (Latecoll D, 4% strength) | 8.5% by weight |
| Water | 3.0% by weight |

The adhesive dispersion used was the VAc/E/VeoVa11® dispersion from Example 3 and the comparison used for it was the VAc/E/EHA dispersion from Comparative Example 15.

The volatile organic compounds in the formulation were determined in accordance with the test method of the GEV (GEV=Gemeinschaft Emissionskontrollierter Verlegewerkstoffe [Association of Emissions-Controlled Laid Materials]) e.V.). With the GEV test method, the emission characteristics of laid materials are determined after defined storage in a test chamber: substances detected are those regarded as carcinogenic or as suspected carcinogens (K1, K2 or K3 according to the Gefahrstoffverordnung/TRGS 905) [German hazardous substances legislation] and polar and nonpolar substances which evaporate after defined storage and are subsequently present in gas form (TVOCs). The emissions originating from the rosin mixture, such as longicycles and terpenes, were not taken into account.

Testing of the formulation containing dispersion from Example 3:

After one day of storage, no K substances (acrylamide, acrylonitrile, benzene, 1,4-dioxane, vinyl acetate, acetaldehyde, and formaldehyde) were detected in the test chamber.

After 10 days of storage, only 77 ppm acetic acid were detected.

Testing of the formulation containing dispersion from Comparative Example 15:

After one day of storage, no K substances (acrylamide, acrylonitrile, benzene, 1,4-dioxane, vinyl acetate, acetaldehyde, and formaldehyde) were detected in the test chamber.

After 10 days of storage, 76 ppm acetic acid and 230 ppm 2-ethylhexanol were detected.

TABLE 1

Adhesive properties of the dispersions

| Example | Polymer | Tg (°C.) | Tack (N/2.5 cm) | RTS (min) | PS (N/2.5 cm) | RTH (min/cm) |
|---|---|---|---|---|---|---|
| 1 | VAc/VeoVa11 ®/E | −14.3 | 2.0 | >3000 | 9.4 | 180 |
| 2 | VAc/VeoVa11 ®/E | −19.4 | 2.7 | >3000 | 12.7 | 340 |
| 3 | VAc/VeoVa11 ®/E | −24.4 | 3.6 | >3000 | 14.7 | 150 |
| 4 | VAc/VeoVa11 ®/E | −24.5 | 9.5 | 230 | 17.9 | 250 |
| 5 | VAc/VeoVa11 ®/E | −21.2 | 5.7 | 600 | 16.0 | 195 |
| 6 | VAc/VeoVa11 ®/E | −20.2 | 3.9 | >3000 | 12.5 | 150 |
| 7 | VAc/VeoVa11 ®/E | −23.8 | 2.9 | >3000 | 11.7 | >10,000 |
| 8 | VAc/VeoVa10 ®/E | −9.6 | 2.1 | >3000 | 8.3 | 180 |
| 9 | VAc/VeoVa10 ®/E | −12.3 | 2.4 | >3000 | 11.2 | 100 |
| 10 | VAc/VeoVa10 ®/E | −14.1 | 2.8 | >3000 | 12.2 | 240 |
| C 11 | VAc/E | −7.5 | 1.0 | 150 | 6.5 | 150 |
| C 12 | VAc/E | −25 | 2.0 | 160 | 8.0 | 180 |
| C 13 | VAc/E/EHA | −14.1 | 4.2 | >3000 | 7.5 | 170 |
| C 14 | VAc/E/EHA | −23.1 | 7.2 | >3000 | 9.0 | 340 |
| C 15 | VAc/E/EHA | −35.0 | 10.0 | >3000 | 15.5 | 450 |

Discussion of the Results from Table 1

As the incorporation of VeoVa11® or VeoVa10® increases, the Tg goes down and thus the surface tack and the adhesion (peel strength, PS) increase (Examples 1 to 3, 8 to 10). The surface tacks, adhesion and cohesion (resistance to shear, RTS) are much better with VeoVa11® or VeoVa10® (Example 3) than in the pure VAc/E system (Comparative Example 12). A reduction in the molecular weight gives polymers with reduced cohesion but better surface tack and adhesion (Example 4).

As is evident from comparing Example 4 with Comparative Example 14, it is possible with VAc/VeoVa/E copolymers to obtain better surface tack and peel strength in comparison to the VAc/E/acrylate system for comparable Tg and cohesion.

What is claimed is:

1. A low-emission adhesive comprising an aqueous, protective-colloid-free polymer dispersion or water-redispersible dispersion powder prepared therefrom, of vinyl ester-ethylene copolymers containing free carboxylic acid groups, obtained by free-radically initiated emulsion polymerization, in aqueous solution and in the presence of at least one emulsifier, of a comonomer mixture comprising
    a) from 5 to 50% by weight of ethylene,
    b) from 20 to 80% by weight of at least one vinyl ester selected from the group consisting of vinyl esters of unbranched or branched carboxylic acids having 1 to 9 carbon atoms whose homopolymers have a glass transition temperature Tg >0° C.,
    c) from 5 to 70% by weight of at least one vinyl ester selected from the group consisting of a vinyl ester of a branched carboxylic acids having 8 to 13 carbon atoms whose homopolymers have a glass transition temperature Tg <0° C.,
    d) from 0.5 to 10% by weight of at least one ethylenically unsaturated monocarboxylic or dicarboxylic acid having 3 to 4 carbon atoms,
    e) from 0 to 10% by weight of at least one ethylenically unsaturated hydroxyalkyl-functional comonomer,
    f) from 0 to 10% by weight of a further mono- or polyethylenically unsaturated comonomer,
the % by weight being based in each case on the overall weight of the comonomers and adding up to 100% by weight, and the dispersion obtained therewith optionally being dried, wherein said vinyl ester-ethylene copolymers are free of moieties derived from (meth)acrylate alkyl esters, and wherein said copolymers have a glass transition temperature of between −60° C. and about −10° C.

2. The low-emission adhesive as claimed in claim 1, wherein vinyl esters b) copolymerized are at least one member selected from the group consisting of vinyl acetate, vinyl propionate, vinyl butyrate, 1-methylvinyl acetate, vinyl pivalate, and vinyl esters of α-branched monocarboxylic acids having 9 carbon atoms.

3. The low-emission adhesive as claimed in claim 1, wherein vinyl esters c) copolymerized are at least one member selected from the group consisting of vinyl 2-ethylhexanoate, vinyl esters of α-branched monocarboxylic acids having 10 or 11 carbon atoms, and vinyl esters of branched monocarboxylic acids having 10 to 13 carbon atoms.

4. The low-emission adhesive as claimed in claim 1, wherein the copolymerized comonomer d) comprises at least one member selected from the group consisting of acrylic acid, methacrylic acid, itaconic acid, fumaric acid, and maleic acid.

5. The low-emission adhesive as claimed in claim 1, wherein the copolymerized comonomer e) comprises at least one member selected from the group consisting of methacrylic and acrylic hydroxyalkyl esters having a $C_1$ to $C_5$ alkyl radical.

6. The low-emission adhesive as claimed in claim 1, wherein copolymerized comonomer f) at least one member selected from the group consisting of ethylenically unsaturated carboxamides, ethylenically unsaturated sulfonic acids and their salts, and vinylpyrrolidone.

7. The low-emission adhesive as claimed in claim 1, wherein said vinyl acetate-ethylene copolymer is a copolymer of a) from 10 to 40% by weight of ethylene, b) from 35 to 70% by weight of vinyl acetate, c) from 10 to 45% by weight of vinyl esters of α-branched monocarboxylic acids having 10 or 11 carbon atoms, d) from 2 to 6% by weight of acrylic acid and/or methacrylic acid, e) from 0 to 5% by weight of hydroxyethyl acrylate, and f) from 0 to 2% by weight of acrylamide.

8. A process of adhering a covering to a substrate which comprises applying to at least a portion of at least one of the covering and substrate surfaces, an adhesive-effective amount of the low-emission adhesive of claim 1, and contacting the surfaces of the covering and the substrate.

9. The process of claim 8 wherein the covering is flooring.

10. The process of claim 8 wherein the covering is a ceiling covering.

11. The process of claim 8 wherein said substrate is an alkaline, cementitious substrate.

12. The vinyl ester-ethylene copolymer of claim 1 having free carboxylic acid groups derived from (meth)acrylic acid.

13. The adhesive of claim 1, wherein said ethylenically unsaturated monocarboxylic or dicarboxylic acid having 3 or 4 carbon atoms is present in said copolymer in an amount of from about 2 weight percent to about 6 weight percent based on the weight of said copolymer.

14. A low-emission adhesive based on an aqueous, protective-colloid-free polymer dispersion or water-redispersible dispersion powders, obtainable therefrom, of vinyl ester-ethylene copolymers containing free carboxylic acid groups, obtainable by free-radically initiated emulsion polymerization, in aqueous medium and in the presence of at least one emulsifier, of a comonomer mixture comprising a) from 10 to 40 weight percent ethylene;

b) from 35 to 70 weight percent vinyl acetate;

c) from 10 to 45% of one or more vinyl esters of $C_{10-11}$ carboxylic acids having a Tg in their homopolymers of 0° C.;

d) from 2–6 weight percent of at least one of methacrylic acid or acrylic acid, the % by weight being based in each case on the overall weight of the comonomers and adding up to 100% by weight, and the dispersion obtained therewith being dried if desired, wherein said vinyl ester-ethylene copolymers are free of moieties derived from (meth)acrylate alkyl esters and wherein said copolymers have a glass transition temperature of between −60° C. and about −10° C.

15. A low-emission adhesive based on an aqueous, protective-colloid-free polymer dispersion or water-redispersible dispersion powders, obtainable therefrom, of vinyl ester-ethylene copolymers, obtainable by free-radically initiated emulsion polymerization, in aqueous medium and in the presence of at least one emulsifier, of a comonomer mixture consisting essentially of a) from 5 to 50% by weight of ethylene, b) from 20 to 80% by weight of at least one vinyl ester selected from the group consisting of vinyl esters of unbranched or branched carboxylic acids having 1 to 9 carbon atoms whose homopolymers have a glass transition temperature Tg >0° C., c) from 5 to 70% by weight of at least one vinyl ester selected from the group consisting of a vinyl ester of a branched carboxylic acids having 8 to 13 carbon atoms whose homopolymers have a glass transition temperature Tg <0° C., d) from 0.5 to 10% by weight of at least one ethylenically unsaturated monocarboxylic or dicarboxylic acid having 3 or 4 carbon atoms, e) from 0 to 10% by weight of at least one ethylenically unsaturated, hydroxyalkyl-functional comonomer, f) from 0 to 10% by weight of a further mono- or polyethylenically unsaturated comonomer, the % by weight being based in each case on the overall weight of the comonomers and adding up to 100% by weight, and the dispersion obtained therewith being dried if desired wherein said vinyl ester-ethylene copolymers are free of moieties derived from (meth)acrylate alkyl esters, and wherein said copolymers have a glass transition temperature of between −60° C. and about −10° C.

16. The vinyl ester-ethylene copolymer of claim 15, wherein said vinyl ester whose homopolymers have a glass transition temperature Tg >0° C. are selected from the group consisting of vinyl acetate, vinyl propionate, vinyl butyrate, and mixtures thereof.

17. The vinyl ester-ethylene copolymer of claim 16, wherein said vinyl ester whose homopolymers have a glass transition temperature Tg <0° C. are selected from the group consisting of vinyl esters of 2-ethylhexanoic acid, α-branched monocarboxylic acids having 10 to 11 carbon atoms and vinyl esters of branched monocarboxylic acids having 10–13 carbon atoms, and mixtures thereof.

18. The vinyl ester-ethylene copolymer of claim 15, wherein said vinyl ester whose homopolymers have a glass transition temperature Tg <0° C. are selected from the group consisting of vinyl esters of 2-ethylhexanoic acid, α-branched monocarboxylic acids having 10 or 11 carbon atoms and vinyl esters of branched monocarboxylic acids having 10–13 carbon atoms, and mixtures thereof.

19. The adhesive of claim 15, wherein said ethylenically unsaturated monocarboxylic or dicarboxylic acid having 3 or 4 carbon atoms is present in said copolymer in an amount of from about 2 weight percent to about 6 weight percent based on the weight of said copolymer.

* * * * *

UNITED STATES PATENT AND TRADEMARK OFFICE
CERTIFICATE OF CORRECTION

PATENT NO. : 6,746,555 B1
DATED : June 8, 2004
INVENTOR(S) : Holger Kunstle et al.

It is certified that error appears in the above-identified patent and that said Letters Patent is hereby corrected as shown below:

Column 9,
Line 60, delete "solution" and insert therefor -- medium --.

Signed and Sealed this

Twenty-third Day of November, 2004

JON W. DUDAS
*Director of the United States Patent and Trademark Office*